UNITED STATES PATENT OFFICE.

FREDERIC LEWIS NATHAN, WILLIAM RINTOUL, AND FRANK BAKER, OF STEVENSTON, SCOTLAND, ASSIGNORS TO E. I. DU PONT DE NEMOURS POWDER COMPANY, OF WILMINGTON, DELAWARE, A CORPORATION OF NEW JERSEY.

EXPLOSIVE.

1,090,641.

Specification of Letters Patent. Patented Mar. 17, 1914.

No Drawing.

Application filed June 4, 1913. Serial No. 771,620.

*To all whom it may concern:*

Be it known that we, FREDERIC LEWIS NATHAN, manager, WILLIAM RINTOUL, chief chemist, and FRANK BAKER, chemist, all of Ardeer Factory, Stevenston, in the county of Ayr, Scotland, have invented a certain new and useful Improvement in and Relating to Explosives, and do hereby declare that the following is a full, clear, and exact description thereof.

This invention relates to the stabilizing of propellant explosives.

However carefully prepared, nitric esters, such as nitrocellulose, nitroglycerin, nitromannite, and nitrostarch, undergo a slow decomposition even at ordinary temperatures, with the result that these substances, and mixtures containing one or more of them, are liable to deteriorate when kept for considerable periods. The products of the decomposition referred to, if allowed to remain in contact with the unchanged esters, exert an accelerating effect on the decomposition. Especially is this the case with explosives containing one or more members of the above mentioned class of chemical compounds, and such explosives are liable to become not merely unserviceable but dangerous. It is therefore essential, in order to obtain an explosive of good chemical stability, that, besides being prepared from thoroughly stabilized materials, it shall have added to it some substance which will have the effect of removing from it or rendering innocuous these products of decomposition.

It is already known that vaseline or mineral jelly exerts a stabilizing action on explosives into which it is introduced. It, however, possesses certain disadvantages which limit the stabilizing effects produced by it. For instance, it is an exceedingly complex substance, some of the components of it being very much less active in their stabilizing properties than others. It is, moreover, entirely insoluble in nitroglycerin. These properties tend to produce a want of homogeneity in the explosive, and ultimately, to limit the stabilizing effect of this substance. We have discovered that certain other substances possess to a very high degree the power of absorbing the harmful products of decomposition, and thus of rendering more stable nitric esters or mixtures containing them, to which they are added. These substances are chemical compounds of the class known as derivatives of urea

in which 1, 2 or 3 of the hydrogen atoms are replaced by various radicals of which one or more is an aromatic radical, such as phenyl, benzyl, naphthyl, phenanthryl, etc., or a homologue of them.

This invention consists therefore broadly in effecting stabilization of propellant explosives formed of or containing a nitric ester by including therein one or more of these substances in suitable quantity.

The following are examples of this class of compound referred to:—

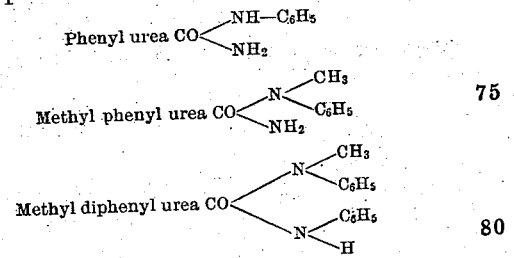

In judging which substance or substances of the mass is or are the most suitable for use in any particular case, we are guided by the properties of the individual compounds, such as volatility, solubility, in nitroglycerin, and the readiness with which they become nitrated. As these substances are introduced into explosives with the view of absorbing the products of decomposition by becoming nitrated, their higher nitro derivatives are unsuitable for this purpose because of the increasing difficulty with which nitration occurs as the degree of nitration rises.

As an example of the use, according to our present invention of one of the above class of compounds an explosive of the following composition may be cited:—

Nitroglycerin ---------------- 30%
Guncotton -------------------- 65%
Ethyl phenyl urea ------------ 5%

These substances possess the property of combining or reacting with the decomposition products of nitric esters and thus preventing them from having any accelerating influence on the decomposition of these esters. The action of any of these substances, when introduced as a stabilizer into nitric esters or mixtures of them consists apparently partly in becoming nitrated by the nitrogen peroxid and other injurious decomposition products of the nitric esters, and partly in reducing these acid products to compounds which have no action on the nitric esters. A further advantage, which some of these urea derivatives possess over mineral jelly, and similar previously proposed substances, is that of being sufficiently soluble in nitroglycerin. When bodies which are insoluble or only slightly soluble in nitroglycerin are added, to a nitroglycerin explosive they often exhibit a tendency to separate out from the finished explosive either in the form of crystals or as an oil. Any separation of this nature is exceedingly disadvantageous for many reasons. The fact that some of these urea derivatives are soluble in nitroglycerin is also important from another point of view, namely, that it tends to the production of a more homogeneous mixture and to the increase of the active mass of the stabilizer present.

We claim:—

1. An explosive containing at least one nitric ester and a urea derivative containing in the amido groups at least one unsubstituted hydrogen atom and at least one aromatic radical containing only carbon and hydrogen in substitution for a hydrogen atom of said groups.

2. An explosive containing nitroglycerin, nitrocellulose and a urea derivative containing in the amido groups at least one unsubstituted hydrogen atom and at least one aromatic radical in substitution for a hydrogen atom of said groups.

3. An explosive containing nitroglycerin, nitrocellulose and ethyl phenyl urea.

4. An explosive containing, gelatinized together, nitroglycerin, nitrocellulose and a urea derivative containing in the amido groups at least one unsubstituted hydrogen atom and at least one aromatic radical in substitution for a hydrogen atom of said groups.

5. An explosive containing, gelatinized gether, nitroglycerin, nitrocellulose and ethyl phenyl urea.

In testimony that we claim the foregoing we have hereunto set our hands.

FREDERIC LEWIS NATHAN.
WILLIAM RINTOUL.
FRANK BAKER.

Witnesses:
ERNEST HANSFORD,
M. B. MILNE.